Figures 1, 2:
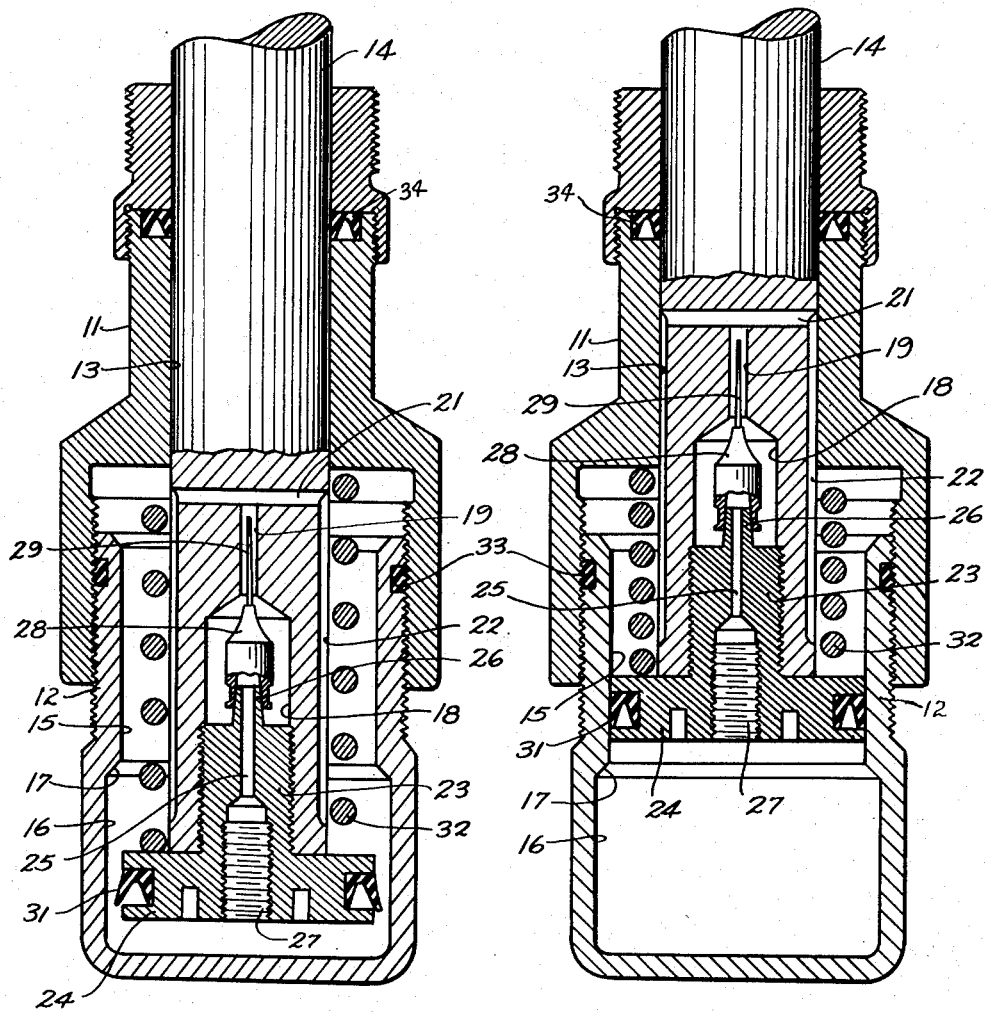

Nov. 30, 1954  J. O. GARRISON ET AL  2,695,777
HYDRAULIC METERING DEVICE
Filed June 21, 1952

Inventor
James O. Garrison
David D. Walker

Tom Walker
Attorney

2,695,777

HYDRAULIC METERING DEVICE

James O. Garrison and David D. Walker, Dayton, Ohio, assignors to Garrison Machine Works, Inc., Dayton, Ohio, a corporation of Ohio Application June 21, 1952, Serial No. 294,956

7 Claims. (Cl. 267—1)

This invention relates to hydraulic metering devices, and more particularly to a metering device which is easily and readily adaptable to various applications and yet is relatively simple and compact.

The object of the invention is to improve the construction as well as the means and mode of operation of hydraulic metering devices, whereby they may not only be economically manufactured, but will be more efficient, satisfactory and accurate in use, automatic in action, uniform in operation, having a minimum number of parts and be unlikely to get out of repair.

A further object of the invention is to obtain a device of the class described which is of a unitary character and of general utility.

Another object of the invention is to provide a metering device wherein the duration of the metering cycle is readily variable.

A further object of the invention is to present a small, compact and reliable metering device of the spring loaded type having ready application as a control element.

Still another object of the invention is to introduce a compound movement in the metering device wherein the moving element has a first phase in which its motion is quick and sudden, the transition from the first to the second phase occurring as an instantaneous action.

A further object of the invention is to provide a hydraulic metering device embodying the advantageous structural features, the inherent meritorious characteristics and mode of operation herein set forth, or their equivalents.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In the accompanying drawing, wherein is shown the preferred but obviously not necessarily the only form of embodiment of the invention, Fig. 1 is a view in longitudinal section of a metering device in accordance with an illustrative embodiment of the invention, the movable element thereof being shown in extended position; and Fig. 2 is a view similar to Fig. 1, showing the movable element in retracted position.

Like parts are indicated by similar characters of reference throughout the several views.

Referring to the drawings, a metering device in accordance with the illustrative embodiment of the invention may comprise a cylindrical housing 11 and a cylinder 12. The housing 11 has a longitudinal bore 13 providing a long bearing for a piston rod or shaft 14. At one end thereof the housing 11 is enlarged or flared outwardly to receive the cylinder 12 which has a screw connection with the housing to permit relative longitudinal adjustments thereof.

The cylinder 12 is cup shaped, being closed at its outer end and open at its inner end. In its interior it is formed with a piston bore 15, opening through the inner end of the cylinder, and with a relatively larger bore or chamber 16 outwardly of bore 15, the bore 15 and chamber 16 being separated by a shoulder 17.

The piston rod or shaft 14 extends through the housing 11 and into the cylinder 12. In its inner end it has an axial chamber 18 connected by a passage 19 with a transverse through bore 21. External grooves 22 in the shaft communicate with the transverse bore 21 and extend toward the inner end of the shaft. There is secured in the chamber 18 an axial projection 23 on a piston 24, the piston 24 being thus fastened to the shaft 14 for reciprocable motion in the cylinder 12. The diameter of the piston 24 substantially equals the diameter of piston bore 15. A bore 25 extends through the piston 24 and projection 23 as well as through a teat 26 on such projection. A counterbore 27 opening through the piston 24 is provided for the mounting therein of a filter element (not shown). Mounted on the teat 26, in position to overlie and communicate with the bore 25, is a restrictor nozzle 28 from which a slender hollow tube 29 projects into the passage 19. The nozzle 28 and tube 29 may, as in the illustrated instance, be the commercially known needle pointed nozzle assembly used in administering hypodermic injections.

The periphery of the piston 24 is recessed and receives a cup or U-shaped packing 31 facing the bottom or closed end of the cylinder 12, the packing 31 being of the type to allow fluid flow past it in the direction faced by the packing but to deny reverse flow. The assembly comprising shaft 14 and piston 24 is urged toward the closed end of the cylinder 12 by a compression spring 32 which at its one end is seated in the bottom of the flared out end of housing 11 and at its other end engages the piston 24.

A packing member 33 is used in the screw connection between the cylinder 12 and housing 11, and a packing member 34 is installed in bore 13 in surrounding relation to the shaft 14.

The metering device contains a quantity of hydraulic fluid which may substantially fill the cylinder 12, with allowance made to permit the cylinder to be fully screwed into the housing 11.

In the operation of the device, the parts normally are positioned as indicated in Fig. 1 wherein the piston 24 is fully extended by the spring 32. As so extended, the piston 24 occupies a position in the relatively large diameter chamber 16, with the sides of the piston spaced from the wall of the chamber. The hydraulic fluid may flow freely around the piston but is not now under any application of pressure producing flow thereof. To initiate a metering operation the piston 24 is retracted against the urging of spring 32 to a position in piston bore 15, for example to the position shown in Fig. 2. It will be understood that retraction of the piston is accomplished by pulling upon the piston shaft 14, such action being a part of a machine or system operation which it is unnecessary here to consider. The shaft 14 is, moreover, connected to some part to be controlled by movement of the piston 24.

In moving from a position in chamber 16 to a position in bore 15, the piston 24 encounters relatively light or no fluid resistance. Displaced fluid moves easily about the piston while it is in chamber 16 and as the piston moves into the smaller diameter bore 15, the packing 31 is squeezed into its groove and allows a continued flow of fluid past it from bore 15 into chamber 16. When the piston 24 has been retracted the desired distance into bore 15, application of the retractive force is discontinued, returning the piston assembly to control of the spring 32. The piston assembly tends to return outward under urging of the spring but the piston 24 immediately encounters a body of hydraulic fluid trapped in advance thereof. Under the reactant pressure of such fluid, the packing 31 expands or flares out against the wall of bore 15 preventing the escape of any of the trapped fluid by flow around the piston. Accordingly, the fluid under pressure can only flow through bore 25, nozzle 28 and small diameter tube 29 to transverse bore 21 and thence by way of grooves 22 to the low pressure area in back of the piston 24. An extending motion of the piston assembly accordingly results, which motion is a slow and gradual one so long as the packing 31 remains in piston bore 15. As this packing reaches and passes shoulder 17, however, a free flow of fluid around the edge of piston 24 is again permitted. The reactant fluid pressure opposing spring 32 accordingly is released and the spring is enabled to move the piston quickly the remaining distance to the extended position of Fig. 1.

The so-called metering cycle extends from the moment the piston assembly is released from the retractive influence applied thereto until the packing 31 passes shoulder 17. The duration of such cycle, for a hydraulic fluid of given viscosity, is a function of the diameter and length of tube 29, pressure of spring 32 and of the required distance of piston travel to shoulder 17. The shaft 14 may have definite positions to which it is retracted, in which case the cylinder 12 can be advanced into or backed out of the housing 11 to shorten or lengthen the metering cycle. This adjustment of the cylinder is accomplished relatively to the piston 24 which has a support in the housing 11 independently of the cylinder.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described our invention, we claim:

1. A hydraulic metering device, including a cylindrical housing expanded at one end and having a longitudinal bore opening into said expanded end, the internal wall of said expanded end being threaded, a cylinder closed at its one end and open at its opposite end, the said open end of said cylinder being received in the expanded end of said housing and externally threaded for cooperative engagement with the threads on said housing, said cylinder being longitudinally adjustable in said housing over a relatively long range by virtue of said screw threads, an annular shoulder in the interior of said cylinder separating said cylinder into a piston chamber and a relatively larger chamber, said larger chamber being in the closed end of said cylinder, a piston rod having a sliding fit in said longitudinal bore and having an inner end projecting into said cylinder, said piston rod being formed with a transverse through bore and with longitudinal peripheral grooves and a longitudinal bore communicating with said transverse bore, a piston attached to the inner end of said piston rod of a size to be received slidingly in said piston chamber and to be spaced from the walls of said larger chamber, a cup packing installed in the periphery of said piston and engageable with the wall of said piston chamber to serve as a one-way valve, a spring seated in the expanded end of said housing and acting on said piston to urge it toward the closed end of said cylinder, and a flow restriction device installed in the said longitudinal bore of said piston rod and controlling communication between the said larger chamber of said cylinder and said transverse bore, the space enclosed by cooperation of the expanded end of said housing and said cylinder being substantially filled with hydraulic fluid.

2. A hydraulic metering device according to claim 1, characterized in that said flow restriction device includes an axial projection on said piston received in the longitudinal bore of said piston rod, said projection having longitudinal flow restrictor means therein.

3. A hydraulic metering device according to claim 2, characterized in that said last named means includes a slender hollow injection needle detachably mounted on said projection.

4. A hydraulic metering device, including a cylindrical housing expanded at one end and having a longitudinal bore opening into said expanded end, a piston rod having a sliding bearing in said bore and having an end projecting through said expanded end, a cylinder having an open end in telescopic connection with said expanded end, the opposite end of said cylinder being closed, said cylinder receiving the projecting end of said piston rod, a transverse through bore in said piston rod, longitudinal peripheral grooves in said rod extending from said transverse bore toward the extremity of the projecting end of said rod, a longitudinal bore in said rod opening from said extremity to said transverse bore, a piston on the said extremity of the projecting end of said piston rod reciprocable in said cylinder with said piston rod, a cup packing installed in the periphery of said piston and engageable with the wall of said cylinder to serve as a one-way valve, a spring seated in the expanded end of said housing and urging said piston toward the closed end of said cylinder, the space enclosed by said cylinder and the expanded end of said housing being substantially filled with a hydraulic fluid, and a slender, hollow injection needle installed in the longitudinal bore of said piston rod controlling the flow of hydraulic fluid under pressure from the space between said piston and the closed end of said cylinder to said transverse through bore.

5. A hydraulic metering device according to claim 4, characterized by a projection on said piston received in the longitudinal bore in said piston rod, said projection having a longitudinal passage therethrough, said injection needle being detachably mounted on said projection in position to transmit fluid flow from said passage to said transverse bore.

6. A hydraulic metering device, including a relatively stationary cylindrical housing terminating at its one end in an expanded portion, the internal wall of said cylinder being screw threaded, a cylinder having an open end received in said expanded portion and externally threaded to achieve a screw threaded engagement with the said expanded portion of said housing, the oppostie end of said cylinder being closed and the space enclosed by said expanded portion and said cylinder being substantially filled with hydraulic fluid, a piston reciprocable in said cylinder, a spring seated on said housing and urging said piston toward the closed end of said cylinder, said piston having a sliding mounting in said housing, flow restrictor means installed in said piston for by-passing fluid from side to side of said piston in response to reciprocation of the piston, and means for limiting the distance said cylinder can be screwed into said housing, said cylinder normally occupying an intermediate position and being adjustable therefrom selectively to locate said cylinder in a longitudinal sense with respect to said piston and without changing the deflection of said spring.

7. A hydraulic metering device, including a cylinder having a piston bore therein containing a hydraulic fluid, a piston reciprocable in said bore and having a sliding fit therein, a spring urging said piston toward one end of said cylinder said piston being retractable toward the other end of the cylinder, a cup leather in the periphery of said piston facing said one end of the cylinder whereby to allow fluid flow thereby toward said one end of the cylinder and to prevent fluid flow thereby in the opposite direction, a small diameter passageway providing for restricted fluid flow in said opposite direction when said piston moves from retracted position under the urging of said spring, a bore in said cylinder relatively larger than said piston bore into which said piston is extended by said spring, the hydraulic fluid having free flow around said piston in said larger bore, and a support for said piston outside said cylinder, said cylinder being adjustable relatively to said support to provide for an earlier or later entry of said piston into said larger bore with respect to its permitted travel under the influence of said spring.

References Cited in the file of this patent

UNITED STATES PATENTS

| Number | Name | Date |
|---|---|---|
| 609,628 | Quackenbush | Aug. 23, 1898 |
| 1,816,169 | Bommer | July 28, 1931 |
| 2,075,857 | Loef | Apr. 6, 1937 |
| 2,423,736 | Tack | July 8, 1947 |
| 2,443,338 | Berry | June 15, 1948 |